Feb. 17, 1953   L. H. HAWKES   2,629,028
SPLIT TROLLEY WIRE FROG OR SWITCH
Filed Oct. 11, 1948
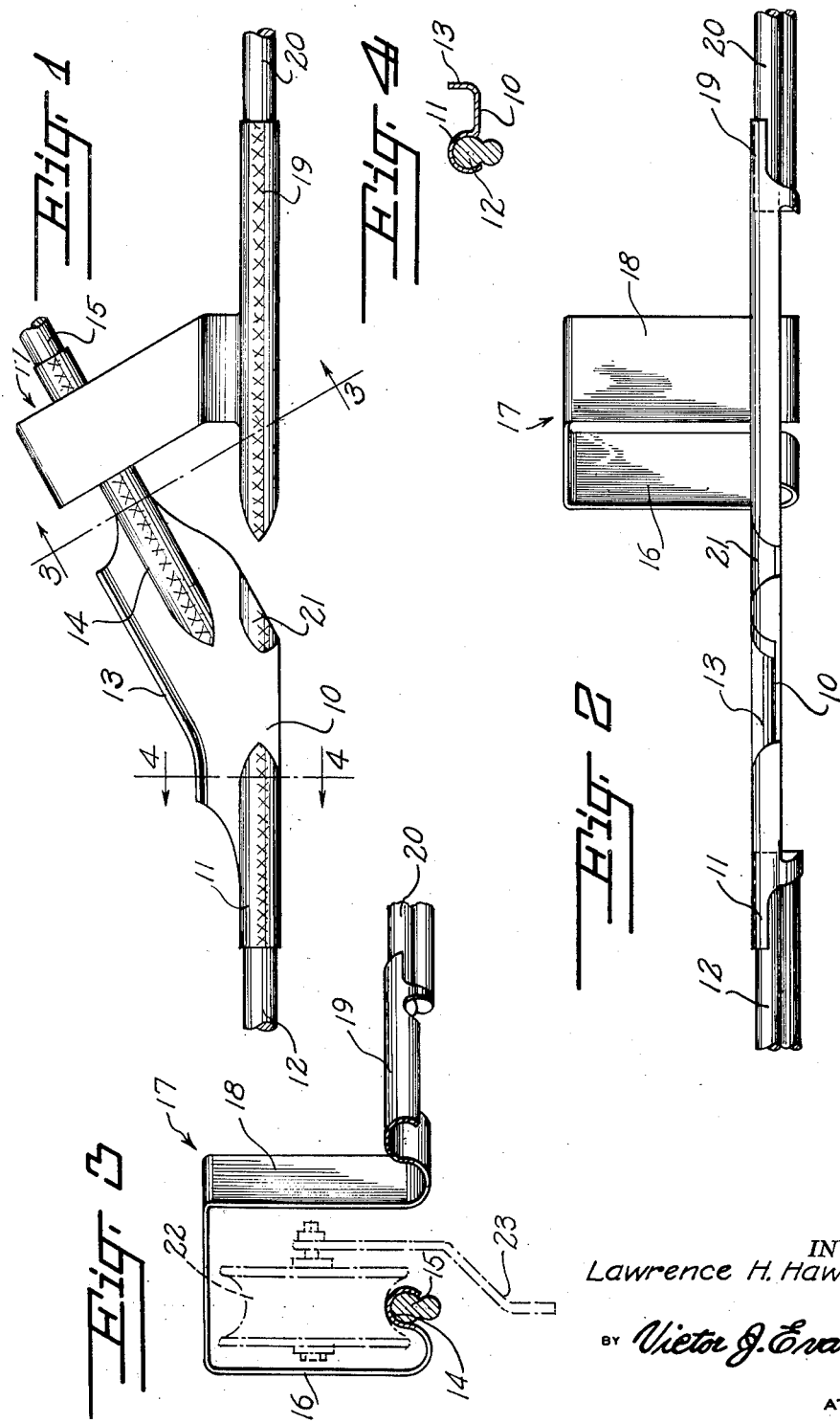
INVENTOR.
Lawrence H. Hawkes
BY Victor J. Evans & Co.
ATTORNEYS Patented Feb. 17, 1953

2,629,028

UNITED STATES PATENT OFFICE 2,629,028

SPLIT TROLLEY WIRE FROG OR SWITCH

Lawrence H. Hawkes, Cannelton, W. Va., assignor of forty per cent to John W. Nitz, Cannelton, W. Va.

Application October 11, 1948, Serial No. 53,802

11 Claims. (Cl. 191—38)

1

This invention relates to trolley wire fixtures of the type used in wires for overhead electric trolley wires.

The object of the invention is to provide a split trolley wire frog or switch which will permit the trolley slide to move along the top thereof and will permit the slide to pass through the frog in order to permit a change in direction of a trolley car.

Another object of the invention is to provide a trolley wire frog that will permit operators of mine machinery to work with a great degree of safety.

A further object of the invention is to provide a split trolley wire frog which is extremely simple and inexpensive to manufacture.

Other objects and advantages will be apparent during the course of the following description.

In the accompanying drawings forming a part of this application, and in which like numerals are employed to designate like parts throughout the same:

Figure 1 is a top plan view of the split trolley wire frog, according to the present invention;

Figure 2 is a side elevational view of the device of Figure 1;

Figure 3 is a sectional view taken on the line 3—3 of Figure 1, illustrating the position of the trolley slide in dotted lines on the frog;

Figure 4 is a sectional view taken on the line 4—4 of Figure 1.

Referring in detail to the drawings, a split trolley wire frog is shown and is used on wires that use electric locomotives or trolleys for moving cars of ore and the like. The frog is arranged on the overhead electric trolley wires and serves as a switch to permit the electric trolley to safely change direction without requiring the operator to manually move the trolley slide.

The split trolley wire frog is preferably fabricated or stamped from a single continuous piece of metal and comprises a horizontally-disposed member 10 provided with a first clamp 11 on one end thereof for receiving and holding an end of an overhead trolley wire 12 which is connected to a source of electrical energy. The member 10 has its side bent to define a guide flange 13 and projecting from the other end of the member 10 is a second clamp 14 for receiving an end of a trolley wire 15 which is arranged angularly with respect to the wire 12 so as to be in alignment with a trolley track, not shown, arranged therebelow.

One leg 16 of a U-shaped bracket 17 is secured

2 to the clamp 14, and the other leg 18 of the bracket 17 is secured to a third clamp 19 which receives an end of a trolley wire 20 that is arranged in alignment with the trolley wire 12. A short semi-cylindrical loop 21 is formed in the member 10 for guiding a trolley slide 22, Figure 3, from the wire 12 onto the wire 20 in the event that the trolley is to continue in a straight path. Each of the clamps 11, 14, and 19 is of arcuate or curved formation and these arcuately shaped clamps are arranged in gripping engagement with the upper cylindrical portion of the trolley wires so that accidental dislodgement of the split trolley wire frog is prevented.

In use, the frog is provided with a plurality of clamps 11, 14, and 19 which are secured to the upper portions of the overhead trolley wires and permit a trolley car, not shown, to change direction along its tracks without the necessity of manipulating the trolly slide 22. Thus, the bracket 17 is arranged so that the slide 22 can pass therebeneath. When the trolley is to continue in a straight path, then upon engagement of the frog by the trolley slide 22, the slide 22 will move along the top of the first clamp 11, across the loop 21, onto the third clamp 19 and across the trolley wire 20 so that at all times electrical energy will be conveyed from the trolley wires through the slide 22, slide holder 23, and to the electric trolley therebelow. When the trolley is to make a change in direction, then upon engagement of the frog by the trolley slide 22, the slide 22 will move along the top of the first clamp 11, across the top of the second clamp 14, and onto the trolley wire 15, and during this operation the slide 22 will pass beneath the bracket 17 and the slide holder 23 will pass between the legs 16 and 18 of the bracket 17. The device obviously is equally useful in insuring an electrical connection between the trolley wires and trolley when the trolleys approach the frog from the opposite direction.

As many embodiments may be made of this invention, and as many modifications may be made in the embodiment hereinbefore shown and described, it is to be understood that all matter herein is to be interpreted merely as illustrative and not in a limiting sense.

I claim:

1. In a split trolley wire frog, a horizontally-disposed metallic member, a first clamp arranged on one end of said member for receiving an end of a trolley wire, a second clamp arranged angularly with respect to said first clamp and projecting from the other end of said member for re- 2,629,028

3 ceiving an end of a trolley wire, a U-shaped bracket having a leg secured to said second clamp for the passage therebeneath of a trolley slide, a third clamp remote therefrom arranged in alignment with said first clamp and secured to a second leg of said bracket for receiving an end of a trolley wire, and a semi-cylindrical loop formed in said horizontally-disposed member intermediate of and in alinement with said first and third clamps, and said loop is adapted at times for guiding a trolley slide from said first clamp to said third clamp.

2. In a trolley wire frog, a plate member, a first trolley wire clamp at one end of the plate member upwardly projecting with respect to the plate member and having a contacting surface upwardly of the plate member, a second trolley wire clamp at the other end of the plate member upwardly projecting therefrom and having a contacting surface upwardly of the plate member substantially in the plane of the contacting surface of the first clamp, said trolley wire clamps extending toward one another but stopping short of one another to provide a space between the inner ends thereof, a third trolley wire clamp offset from the plate member having a contacting upper surface, and an overhead bridging bracket connecting the third clamp with the plate member to have the contacting surface of said third clamp substantially in the plane of the contacting surfaces of said first and second clamps and with said third clamp spaced from the plate to provide a passageway therebetween, each of said clamps being adapted to have a trolley wire slide move on the upper contacting surface thereof with one of said second and third clamps in axial alignment with the first clamp and with the other of said second and third clamps having its axis angularly disposed to the axis of the first clamp with said axes crossing one another at a point substantially at the inner end of the first clamp, the construction being such that the trolley wire slide in moving from the first clamp to one of the second and third clamps passes through the space between the inner ends of the first and second clamps and in moving from the first clamp to the other of the second and third clamps passes beneath the overhead bridging bracket and through the passageway between said third clamp and plate member.

3. In a trolley wire frog, a plate member, a first trolley wire clamp at one end of the plate member upwardly projecting with respect to the plate member and having a contacting surface upwardly of the plate member, a second trolley wire clamp at the other end of the plate member upwardly projecting therefrom and having a contacting surface upwardly of the plate member substantially in the plane of the contacting surface of the first clamp, said trolley wire clamps extending toward one another but stopping short of one another to provide a space between the inner ends thereof, a third trolley wire clamp offset from the plate member having a contacting upper surface, an overhead bridging bracket connecting the third clamp with the plate member to have the contacting surface of said third clamp substantially in the plane of the contacting surfaces of said first and second clamps and with said third clamp spaced from the plate to provide a passageway therebetween, each of said clamps being adapted to have a trolley wire slide move on the upper contacting surfaces thereof with one of said second and third clamps in axial

4 alignment with the first clamp and with the other of said second and third clamps having its axis angularly disposed to the axis of the first clamp with said axes crossing one another at a point substantially at the inner end of the first clamp, the construction being such that the trolley wire slide in moving from the first clamp to one of the second and third clamps passes through the space between the inner ends of the first and second clamps and in moving from the first clamp to the other of the second and third clamps passes beneath the overhead bridging bracket and through the passageway between said third clamp and plate member, and guide means upstanding from the plate member in axial alignment with the axis of the clamp offset from the plate member and said guide means having an upper contacting surface in substantial alignment with the contacting surface of said first clamp and with said guide means extending toward the first clamp but with the inner end of the guide means stopping short of the first clamp to provide a passageway therebetween.

4. In a trolley wire frog, a plate member, a first trolley wire clamp at one end of the plate member upwardly projecting with respect to the plate member and having a contacting surface upwardly of the plate member, a second trolley wire clamp at the other end of the plate member upwardly projecting therefrom and having a contacting surface upwardly of the plate member substantially in the plane of the contacting surface of the first clamp, said trolley wire clamps extending toward one another but stopping short of one another to provide a space between the inner ends thereof, a third trolley wire clamp offset from the plate member having a contacting upper surface, an overhead bridging bracket connecting the third clamp with the plate member to have the contacting surface of said third clamp substantially in the plane of the contacting surfaces of said first and second clamps and with said third clamp spaced from the plate to provide a passageway therebetween, each of said clamps being adapted to have a trolley wire slide move on the upper contacting surfaces thereof with one of said second and third clamps in axial alignment with the first clamp and with the other of said second and third clamps having its axis angularly disposed to the axis of the first clamp with said axes crossing one another at a point substantially at the inner end of the first clamp, the construction being such that the trolley wire slide in moving from the first clamp to one of the second and third clamps passes through the space between the inner ends of the first and second clamps and in moving from the first clamp to the other of the second and third clamps passes beneath the overhead bridging bracket and through the passageway between said third clamp and plate member, and tapered ends at the inner ends of said clamps to provide a maximum length of contact surface on each clamp and with the sides of the tapers adjacent the space between the first and second clamps and adjacent the plate acting as parts of walls defining said space and passageway.

5. In a trolley wire frog, a plate member, a first trolley wire clamp at one end of the plate member upwardly projecting with respect to the plate member and having a contacting surface upwardly of the plate member, a second trolley wire clamp at the other end of the plate member upwardly projecting therefrom and having a contacting surface upwardly of the plate member substantially in the plane of the contacting surface of the first clamp, said trolley wire clamps extending toward one another but stopping short of one another to provide a space between the inner ends thereof, a third trolley wire clamp offset from the plate member having a contacting upper surface, an overhead bridging bracket connecting the third clamp with the plate member to have the contacting surface of said third clamp substantially in the plane of the contacting surfaces of said first and second clamps and with said third clamp spaced from the plate to provide a passageway therebetween, each of said clamps being adapted to have a trolley wire slide move on the upper contacting surfaces thereof with one of said second and third clamps in axial alignment with the first clamp and with the other of said second and third clamps having its axis angularly disposed to the axis of the first clamp with said axes crossing one another at a point substantially at the inner end of the first clamp, the construction being such that the trolley wire slide in moving from the first clamp to one of the second and third clamps passes through the space between the inner ends of the first and second clamps and in moving from the first clamp to the other of the second and third clamps passes beneath the overhead bridging bracket and through the passageway between said third clamp and plate member, guide means upstanding from the plate member in axial alignment with the axis of the clamp offset from the plate member and said guide means having an upper contacting surface in substantial alignment with the contacting surface of said first clamp and with said guide means extending toward the first clamp but with the inner end of the guide means stopping short of the first clamp to provide a passageway therebetween, and tapered ends at the inner ends of said clamps and guide means to provide a maximum length of contact surface on each clamp and guide means and with the sides of the tapers adjacent the space between the first and second clamps and adjacent the plate acting as parts of walls defining said space and passageways.

6. In a trolley wire frog, a plate member, a first trolley wire clamp at one end of the plate member upwardly projecting with respect to the plate member and having a contacting surface upwardly of the plate member, a second trolley wire clamp at the other end of the plate member upwardly projecting therefrom and having a contacting surface upwardly of the plate member substantially in the plane of the contacting surface of the first clamp, said trolley wire clamps extending toward one another but stopping short of one another to provide a space between the inner ends thereof, a third trolley wire clamp offset from the plate member having a contacting upper surface, an overhead bridging bracket connecting the third clamp with the plate member to have the contacting surface of said third clamp substantially in the plane of the contacting surfaces of said first and second clamps and with said third clamp spaced from the plate to provide a passageway therebetween, each of said clamps being adapted to have a trolley wire slide move on the upper contacting surface thereof with one of said second and third clamps in axial alignment with the first clamp and with the other of said second and third clamps having its axis angularly disposed to the axis of the first clamp with said axes crossing one another at a point substantially at the inner end of the first clamp, the construction being such that the trolley wire slide in moving from the first clamp to one of the second and third clamps passes through the space between the inner ends of the first and second clamps and in moving from the first clamp to the other of the second and third clamps passes beneath the overhead bridging bracket and through the passageway between said third clamp and plate member, said plate member extending laterally of the first and second clamps, and a guide flange upstanding from the edge of the plate member parallel with the direction of extent of the axis of the first and second clamps so as to provide a guard laterally of the space between the inner ends of the first and second clamps.

7. In a trolley wire frog, a plate member, a first trolley wire clamp at one end of the plate member upwardly projecting with respect to the plate member with its axis extending substantially longitudinally of the plate member and having a contacting surface upwardly of the plate member, a second trolley wire clamp at the other end of the plate member upwardly projecting therefrom with its axis angularly disposed to the axis of the first clamp and having a contacting surface upwardly of the plate member substantially in the plane of the contacting surface of the first clamp, said trolley wire clamps extending toward one another to have their axes cross and having inner ends short of one another to provide a space therebetween in the vicinity of the crossing of their axes, a third trolley wire clamp offset from the plate member and having a contacting upper surface, and an overhead bridging bracket connecting the third clamp with the plate member with a passageway between the inner end of the third clamp and the plate member and with the axis of the third clamp in axial alignment with the axis of the first clamp and said third clamp having a contacting surface substantially in the plane of the contacting surfaces of said first and second clamps, each of said clamps being adapted to have a trolley wire slide move on the contacting upper surface thereof and in moving from the first clamp to the second clamp passes through the passageway between the inner end of the third clamp and the plate member and beneath the overhead bridge and the trolley slide in moving from the first clamp to the third clamp passes through the space between the inner ends of the first and second clamps.

8. In a trolley wire frog, a plate member, a first trolley wire clamp at one end of the plate member upwardly projecting with respect to the plate member with its axis extending substantially longitudinally of the plate member and having a contacting surface upwardly of the plate member, a second trolley wire clamp at the other end of the plate member upwardly projecting therefrom with its axis angularly disposed to the axis of the first clamp and having a contacting surface upwardly of the plate member substantially in the plane of the contacting surface of the first clamp, said trolley wire clamps extending toward one another to have their axes cross and having inner ends short of one another to provide a space therebetween in the vicinity of the crossing of their axes, a third trolley wire clamp offset from the plate member and having a contacting upper surface, an overhead bridging bracket connecting the third clamp with the plate member with a passageway between the inner end of the third clamp and the plate member and with the axis of the third clamp in axial alignment with the axis of the first clamp and said third clamp having a contacting surface substantially in the plane of the contacting surfaces of said first and second clamps, each of said clamps being adapted to have a trolley wire slide move on the contacting upper surface thereof and in moving from the first clamp to the second clamp passes through the passageway between the inner end of the third clamp and the plate member and beneath the overhead bridge and the trolley slide in moving from the first clamp to the third clamp passes through the space between the inner ends of the first and second clamps, and guide means upstanding from the plate member in axial alignment with the axis of the first and third clamps having an upper contacting surface in substantial alignment with the contacting surface of said first and third clamps but with the inner end of the guide means stopping short of the first clamp to provide a passageway therebetween.

9. In a trolley wire frog, a plate member, a first trolley wire clamp at one end of the plate member upwardly projecting with respect to the plate member with its axis extending substantially longitudinally of the plate member and having a contacting surface upwardly of the plate member, a second trolley wire clamp at the other end of the plate member upwardly projecting therefrom with its axis angularly disposed to the axis of the first clamp and having a contacting surface upwardly of the plate member substantially in the plane of the contacting surface of the first clamp, said trolley wire clamps extending toward one another to have their axes cross and having inner ends short of one another to provide a space therebetween in the vicinity of the crossing of their axes, a third trolley wire clamp offset from the plate member and having a contacting upper surface, an overhead bridging bracket connecting the third clamp with the plate member with a passageway between the inner end of the third clamp and the plate member and with the axis of the third clamp in axial alignment with the axis of the first clamp and said third clamp having a contacting surface substantially in the plane of the contacting surfaces of said first and second clamps, each of said clamps being adapted to have a trolley wire slide move on the contacting upper surface thereof and in moving from the first clamp to the second clamp passes through the passageway between the inner end of the third clamp and the plate member and beneath the overhead bridge and the trolley slide in moving from the first clamp to the third clamp passes through the space between the inner ends of the first and second clamps, and tapered ends at the inner ends of said clamps to provide a maximum length of contact surface on each clamp and with the sides of the tapers adjacent the space between the first and second clamps and adjacent the passageway between the plate and third clamp acting as parts of walls defining said space and passageway.

10. In a trolley wire frog, a plate member, a first trolley wire clamp at one end of the plate member upwardly projecting with respect to the plate member with its axis extending substantially longitudinally of the plate member and having a contacting surface upwardly of the plate member, a second trolley wire clamp at the other end of the plate member upwardly projecting therefrom with its axis angularly disposed to the axis of the first clamp and having a contacting surface upwardly of the plate member substantially in the plane of the contacting surface of the first clamp, said trolley wire clamps extending toward one another to have their axes cross and having inner ends short of one another to provide a space therebetween in the vicinity of the crossing of their axes, a third trolley wire clamp offset from the plate member and having a contacting upper surface, an overhead bridging bracket connecting the third clamp with the plate member with a passageway between the inner end of the third clamp and the plate member and with the axis of the third clamp in axial alignment with the axis of the first clamp and said third clamp having a contacting surface substantially in the plane of the contacting surfaces of said first and second clamps, each of said clamps being adapted to have a trolley wire slide move on the contacting upper surface thereof and in moving from the first clamp to the second clamp passes through the passageway between the inner end of the third clamp and the plate member and beneath the overhead bridge and the trolley slide in moving from the first clamp to the third clamp passes through the space between the inner ends of the first and second clamps, guide means upstanding from the plate member in axial alignment with the axis of the first and third clamps having an upper contacting surface in substantial alignment with the contacting surface of said first and third clamps but with the inner end of the guide means stopping short of the first clamp to provide a passageway therebetween, and tapered ends at the inner ends of said clamps and guide means to provide a maximum length of contact surface on each clamp and guide means and with the sides of the tapers adjacent the space between the first and second clamps and adjacent the passageway between the plate member and third clamp acting as parts of walls defining said space and passageways.

11. In a trolley wire frog, a plate member, a first trolley wire clamp at one end of the plate member upwardly projecting with respect to the plate member with its axis extending substantially longitudinally of the plate member and having a contacting surface upwardly of the plate member, a second trolley wire clamp at the other end of the plate member upwardly projecting therefrom with its axis angularly disposed to the axis of the first clamp and having a contacting surface upwardly of the plate member substantially in the plane of the contacting surface of the first clamp, said trolley wire clamps extending toward one another to have their axes cross and having inner ends short of one another to provide a space therebetween in the vicinity of the crossing of their axes, a third trolley wire clamp offset from the plate member and having a contacting upper surface, an overhead bridging bracket connecting the third clamp with the plate member with a passageway between the inner end of the third clamp and the plate member and with the axis of the third clamp in axial alignment with the axis of the first clamp and said third clamp having a contacting surface substantially in the plane of the contacting surfaces of said first and second clamps, each of said clamps being adapted to have a trolley wire slide move on the contacting upper surface thereof and in moving from the first clamp to the second clamp passes through the passageway between the inner end of the third clamp and the plate member and beneath the overhead bridge and the trolley slide in moving from the first clamp to the third clamp passes through the space between the inner ends of the first and second clamps, said plate member extending laterally of the first and second clamps, and a guide flange upstanding from the edge of the plate member parallel with the direction of extent of the first and second clamps so as to provide a guard laterally of the space between the inner ends of the first and second clamps.

LAWRENCE H. HAWKES.

REFERENCES CITED

The following references are of record in the file of this patent:

UNITED STATES PATENTS

| Number | Name | Date |
|---|---|---|
| 426,102 | Blackwell | Apr. 22, 1890 |
| 432,581 | Thomson | July 22, 1890 |
| 508,672 | Bentley | Nov. 14, 1893 |
| 2,288,681 | Chandler | July 7, 1942 |